US012272334B2

(12) United States Patent
Park

(10) Patent No.: US 12,272,334 B2
(45) Date of Patent: Apr. 8, 2025

(54) METHOD TO CALIBRATE THE LUMINANCE OF THE DISPLAY PANEL

(71) Applicant: LG Display Co., Ltd., Seoul (KR)

(72) Inventor: Hyeonju Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/543,654

(22) Filed: Dec. 18, 2023

(65) Prior Publication Data

US 2024/0242694 A1 Jul. 18, 2024

(30) Foreign Application Priority Data

Jan. 13, 2023 (KR) ........................ 10-2023-0005100

(51) Int. Cl.
*G09G 5/10* (2006.01)

(52) U.S. Cl.
CPC ....... *G09G 5/10* (2013.01); *G09G 2320/0233* (2013.01); *G09G 2320/0693* (2013.01); *G09G 2360/16* (2013.01)

(58) Field of Classification Search
CPC ............. G09G 5/10; G09G 2320/0233; G09G 2320/0693; G09G 2360/16
See application file for complete search history.

(56) References Cited

U.S. PATENT DOCUMENTS

| | | | | |
|---|---|---|---|---|
| 12,033,354 B2 * | 7/2024 | Naganuma | G01M 11/0264 | |
| 2008/0049049 A1 * | 2/2008 | Park | G09G 3/20 | 345/690 |
| 2021/0174754 A1 * | 6/2021 | Yang | G06N 20/00 | |
| 2022/0223090 A1 * | 7/2022 | Kim | G09G 3/2003 | |
| 2023/0326427 A1 * | 10/2023 | Singh | G09G 5/003 | 345/589 |
| 2024/0029615 A1 * | 1/2024 | Kang | G09G 3/2007 | |

* cited by examiner

*Primary Examiner* — Kenneth B Lee, Jr.
(74) *Attorney, Agent, or Firm* — Fenwick & West LLP

(57) ABSTRACT

The present disclosure relates to a method of calibrating luminance of a display panel and can accurately derive a calibration value for luminance of the display panel through a first luminance calibration step of calibrating the display panel using a first calibration value derived after the display panel is driven with a first grayscale value and a second luminance calibration step of calibrating the display panel using a second calibration value derived after the display panel calibrated using the first calibration value is driven with a second grayscale value.

19 Claims, 7 Drawing Sheets

METHOD TO CALIBRATE THE LUMINANCE OF THE DISPLAY PANEL

CROSS-REFERENCE TO RELATED APPLICATION

This application claims priority from Republic of Korea Patent Application No. 10-2023-0005100, filed on Jan. 13, 2023, which is hereby incorporated by reference in its entirety.

BACKGROUND

Field of Technology

An embodiment of the present specification relates to a method to calibrate the luminance of a display panel.

Description of Related Art

In accordance with the development of an information society, requests for display devices for displaying images have increased in various forms, and various types of display devices such as a liquid crystal display device, a plasma display device, and an organic light emitting device are used.

In a display panel included in a display device, subpixels disposed in the display panel can emit light with mutually-different luminance levels in accordance with a processing procedure, processing characteristics, and individual characteristics of elements, and the like.

In order to drive a finished display panel with uniform luminance, it is necessary to secure a luminance difference for respective positions in the display panel.

SUMMARY

In a state in which a display panel is caused to emit light with specific luminance, the display panel can be captured through a camera.

A panel luminance video (PLV) acquired through imaging can represent luminance differences for respective positions in the display panel.

Meanwhile, a display panel may include a dark area in which an image is dark and a bright area in which an image is bright.

In a case in which a luminance difference between a dark area and a bright area goes out of the limit of a dynamic range (DR) of a camera, the panel luminance video (PLV) may not be able to appropriately image luminance differences for respective positions in the display panel.

According to embodiments of this specification, a method to calibrate the luminance of a display panel capable of accurately deriving a calibration value for luminance of the display panel can be provided.

In addition, according to embodiments of this specification, by accurately deriving a calibration value for luminance of a display panel, a method to calibrate luminance of the display panel capable of having low power consumption can be provided.

According to an embodiment of this specification, a method to calibrate luminance of a display panel including: generating a first panel luminance video by capturing a display panel driven with a first grayscale; calculating a first calibration value for the first panel luminance video; calibrating the display panel using the first calibration value; generating a second panel luminance video by driving the display panel calibrated using the first calibration value with a second grayscale and capturing the display panel driven with the second grayscale; calculating a second calibration value for the second panel luminance video; and calibrating the display panel using the second calibration value can be provided.

According to an embodiment of this specification, a method to calibrate the luminance of a display panel capable of accurately deriving a calibration value for luminance of the display panel can be provided.

According to an embodiment of this specification, by accurately deriving a calibration value for luminance of a display panel, a method to calibrate luminance of the display panel capable of having low power consumption can be provided.

DETAILED DESCRIPTION

Figure 1:
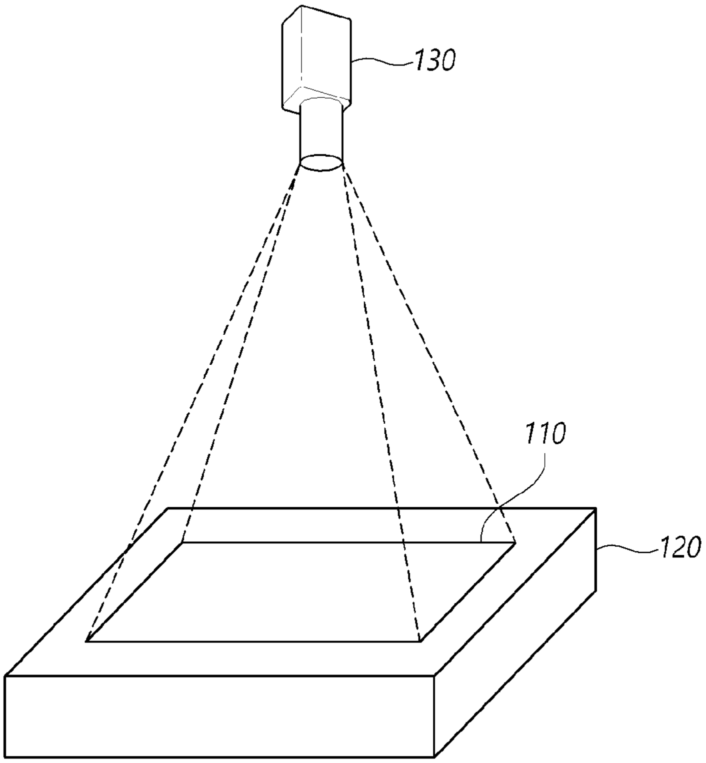
FIG. 1 is a diagram relating to a method to calibrate luminance of a display panel according to an embodiment of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of this specification will be described in detail with reference to the attached drawings.

FIG. 1 is a diagram relating to a method to calibrate luminance of a display panel 110 according to an embodiment of the present disclosure.

The display panel 110 may be produced through multiple processes. A finished display panel 110 may go through various inspection processes. In various inspection processes, a process of inspecting luminance according to a position in the display panel 110 may be included.

Referring to FIG. 1, the display panel 110 disposed on an inspection stand 120 can be checked.

Multiple subpixels (SP) may be disposed in the finished display panel 110. The multiple subpixels (SP) may include multiple elements. For example, the multiple subpixels (SP) may include a light emitting element (ED) used for expressing a video frame and a driving transistor (DRT) used for driving the light emitting element (ED).

In accordance with a processing procedure, processing characteristics, individual characteristics of elements, and the like, respective subpixels disposed in the display panel 110 can be caused to emit light with mutually-different luminance levels. In order to drive the finished display panel 110 with uniform luminance, it is necessary to secure luminance differences for respective positions in the display panel 110.

The luminance differences for respective positions in the display panel 110 may be secured through video capturing.

A display compensation system may include a display compensation device and a luminance capturing camera. The luminance uniformity can be calibrated. Referring to FIG. 1, a luminance capturing camera 130 capturing the display panel 110 can be checked.

The luminance capturing camera 130 may generate a panel luminance video (PLV) representing luminance differences for respective positions in the display panel (110) by capturing the display panel 110.

The luminance capturing camera 130 may be a CCD camera that includes a charge couple device (CCD). Alternatively, the luminance capturing camera (130) may be a CMOS camera that includes a complementary metal oxide semiconductor (CMOS). Here, the type of the luminance capturing camera 130 is not limited thereto.

Figure 2:
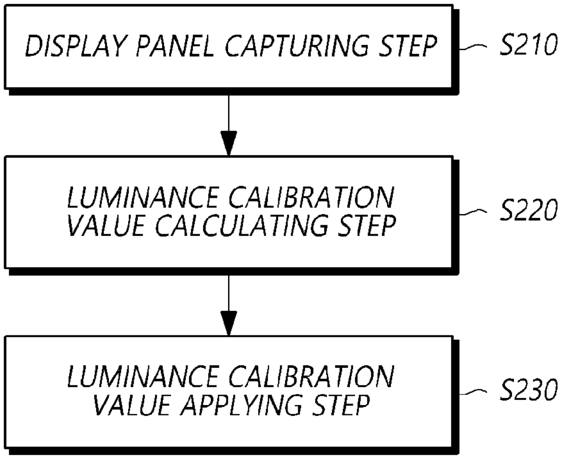
FIG. 2 is a flowchart of a method to calibrate luminance uniformity of a display panel according to an embodiment of the present disclosure.

FIG. 2 is a flowchart of a method to calibrate luminance uniformity of a display panel 110 according to an embodiment of the present disclosure.

The method to calibrate luminance uniformity of the display panel 110 may include a display panel capturing step (S210), a luminance calibration value calculating step (S220), and a luminance calibration value applying step (S230).

The display panel capturing step (S210) may be a step in which the display panel 110 is captured using the luminance capturing camera 130.

In the display panel capturing step (S210) capturing the display panel, a panel luminance video (PLV) may be generated by capturing the display panel (110) through the luminance capturing camera (130).

The panel luminance video (PLV) may include multiple pieces of panel luminance intensity data (PLID).

The magnitudes of the multiple pieces of panel luminance intensity data (PLID) may be determined in accordance with a setting of the luminance capturing camera 130.

For example, in a case in which the luminance capturing camera 130 is set such that a data range is 12 bits, the magnitude of the panel luminance intensity data (PLID) may be 0 to 4095. For example, in a case in which the range of data is set to 10 bits, the magnitude of the panel luminance intensity data (PLID) may be 0 to 1023, and, in a case in which the range of data is set to 11 bits, the magnitude of the panel luminance intensity data (PLID) may be 0 to 2047.

The brighter the luminance of the display panel 110, the larger the magnitude of the panel luminance intensity data (PLID) may become, and the darker the luminance of the display panel 110, the smaller the panel luminance intensity data (PLID) may become. Here, in accordance with the setting of the luminance capturing camera 130, the brighter the luminance of the display panel 110, the smaller the magnitude of the panel luminance intensity data (PLID) may become, and the darker the luminance of the display panel 110, the larger the panel luminance intensity data (PLID) may become.

The number of multiple pieces of panel luminance intensity data (PLID) may be the same as the resolution of the display panel 110.

For example, the resolution of the display panel (110) may be 720*1280 with reference to HD resolution, and, in such a case, the number of multiple pieces of panel luminance intensity data (PLID) may be 720*1280. The resolution of the display panel (110) may be 1080*1920 with reference to FHD resolution, and, in such a case, the number of multiple pieces of panel luminance intensity data (PLID) may be 1080*1920. The resolution of the display panel (110) may be 2160*3840 with reference to FHD resolution, and, in such a case, the number of multiple pieces of the panel luminance intensity data (PLID) may be 2160*3840.

In some cases, the number of multiple pieces of panel luminance intensity data (PLID) may be measured to be smaller than the resolution of the display panel 110.

For example, the panel luminance video (PLV) may include multiple pieces of panel luminance intensity data (PLID), and the number of multiple pieces of the panel luminance intensity data (PLID) may be 2160*3840. For example, in a case in which the data range of the luminance capturing camera (130) is set to 12 bits, each of 2160*3840 multiple pieces of panel luminance intensity data (PLID) may have data in the range of 0 to 4085. Referring to FIGS.

3 and 4, it can be checked that magnitude differences of multiple pieces of panel luminance intensity data (PLID) are represented as shading differences or color differences in the panel luminance video (PLV).

The luminance calibration value calculating step (S220) may be a step in which a luminance calibration value (LCV) corresponding to the panel luminance intensity data (PLID) is calculated.

The luminance calibration value (LCV) may be derived using target luminance (target intensity), panel luminance intensity data (PLID), a gamma value representing a relation of luminance—a grayscale value, a specific grayscale value with which the display panel is driven, and the like.

In a case in which the luminance calibration value (LCV) is applied to the display panel 110, the display panel 110 needs to be driven with uniform luminance. In other words, since the display panel needs to be driven with uniform luminance, the uniform luminance described above may be referred to as target luminance (target intensity).

The image quality of the display device 100 may be determined in accordance with various factors. Among them, gamma is a factor determining an inter-luminance correlation between brightness (gray) of a signal input to the display device 100 and a video appearing on the screen. Thus, a difference in the luminance of the display panel 110 occurs in accordance with a gamma value. In a case in which the gamma value is 1, the brightness levels of an input and an output are the same. In a case in which the gamma value is larger than 1, the screen is expressed slightly darker in an intermediate grayscale area and a low grayscale area. In a case in which the gamma value is smaller than 1, the screen is expressed slightly brighter in an intermediate grayscale area and a low grayscale area.

For example, the luminance of light output from the display panel 110 may differ in accordance with the gamma value. A graph relating to a relation between a gamma value and luminance may be referred to as a gamma-curve graph. Generally, a standard value of the gamma value may be 2.2, and the gamma value may be changed in accordance with the specifications (Spec) of the display device 100.

The luminance calibration value (LCV) needs to be derived such that the display panel 110 is driven to have target luminance (target intensity). The luminance calibration value (LCV) includes multiple calibration values, and the number of the multiple calibration values is the same as the number of multiple pieces of panel luminance intensity data (PLID). Each of the multiple calibration values needs to be derived such that corresponding panel luminance intensity data (PLID) becomes target luminance (a target intensity). At this time, the gamma value may be also considered in the calibration value. In other words, the luminance calibration value (LCV) may be derived using target luminance (a target intensity), panel luminance intensity data (PLID), a gamma value representing a relation of luminance—a grayscale value, a specific grayscale value with which the display panel is driven, and the like.

For example, the luminance calibration value (LCV) may be derived using a relation formula of "{(target luminance/panel luminance intensity)^(1/2.2)}*grayscale value". This is merely one example, and a method for deriving the luminance calibration value (LCV) is not particularly limited.

The luminance calibration value applying step (S230) may be a step in which the luminance calibration value (LCV) is applied to the display panel.

In a case in which the derived luminance calibration value (LCV) is applied to the display panel 110, the display panel 110 can be driven with uniform luminance.

For example, when the display panel 110 is driven to express a grayscale value of 192, a data voltage (VData) used for expressing the grayscale value of 192 may be supplied to a specific subpixel. A luminance calibration value (LCV) for this specific subpixel may be calculated as a grayscale value of 200. In such a case, even when the display panel 110 is driven for expressing the grayscale value of 192, a data voltage (VData) used for expressing the grayscale value of 200 may be supplied to the specific subpixel.

By applying the method described above, the luminance uniformity of the display panel 110 can be improved.

Figure 3:
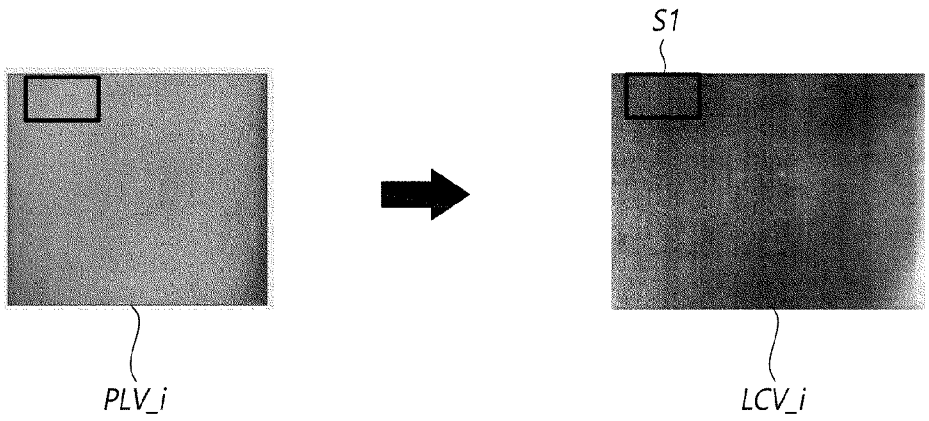
FIG. 3 is a diagram relating to an ideal panel luminance video according to an embodiment of the present disclosure and a luminance calibration value thereof.
Figure 4:
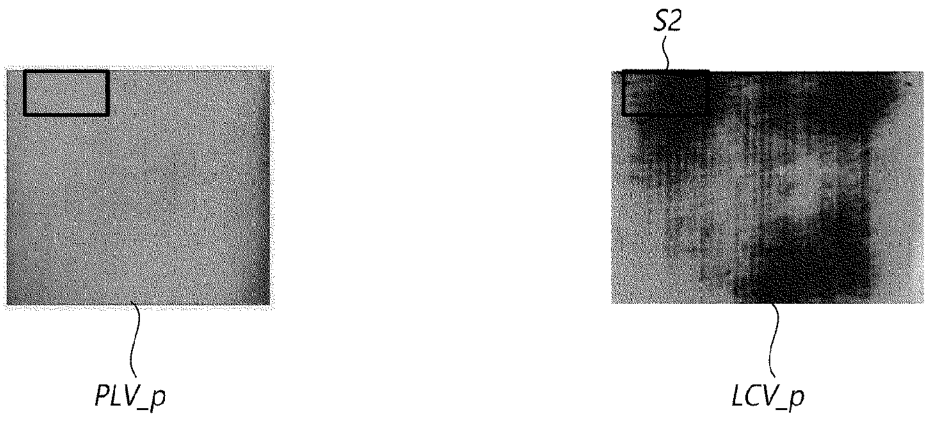
FIG. 4 is a diagram relating to an actual panel luminance video according to an embodiment of the present disclosure and luminance calibration values thereof.

FIG. 3 is a diagram relating to an ideal panel luminance video (PLV_i) according to an embodiment of the present disclosure and luminance calibration values (LCV_i) thereof. FIG. 4 is a diagram relating to an actual panel luminance video (PLV_P) according to an embodiment of this specification and luminance calibration values (LCV_P) thereof.

When the display panel 110 is captured through the luminance capturing camera 130, an area in which an image is dark and an area in which an image is bright may be present at the same time in the display panel (110).

The wider a dynamic range (DR) of the luminance capturing camera 130, the more advantageous it becomes to simultaneously capture a bright image and a dark image.

For example, in a case in which a brightness difference between a bright image and a dark image is out of the dynamic range (DR), the luminance capturing camera 130 may be unable to accurately capture the bright image and the dark image.

For example, although dark image areas can emit light with mutually-different dark luminance levels, the luminance capturing camera 130 may capture images with the same dark luminance level due to a limit of the dynamic range (DR) of the luminance capturing camera 130. This may be seen as if images of dark areas are aggregated, and this may be referred to as an image aggregation phenomenon.

For example, although bright image areas can emit light with mutually-different bright luminance levels, the luminance capturing camera 130 may capture images with the same bright luminance level due to a limit of the dynamic range (DR) of the luminance capturing camera 130. This may be seen as if images of bright areas are aggregated.

A case in which there is no limit of the dynamic range (DR) of the luminance capturing camera 130 may be regarded as an ideal case, and, in this case, the image aggregation phenomenon described above does not occur. However, in an actual case, there is a limit of the dynamic range (DR) of the luminance capturing camera 130, and thus the image aggregation phenomenon described above occurs. Hereinafter, an ideal case and an actual case will be compared with each other in description.

Referring to FIG. 3, a panel luminance video (PLV_i) acquired by assuming an ideal case can be checked. The ideal panel luminance video (PLV_i) can completely reflect luminance differences in the display panel (110). By using the ideal panel luminance video (PLV_i), corresponding ideal luminance calibration values (LCV_i) can be derived. In a case in which the display panel 110 is calibrated using the ideal luminance calibration values (LCV_i), the luminance uniformity of the display panel 110 can be ideally improved.

Referring to FIG. 4, a panel luminance video (PLV_p) acquired by assuming an actual case can be checked. The actual panel luminance video (PLV_p) may not completely reflect luminance differences in the display panel 110. By using the actual panel luminance video (PLV_p), an actual luminance calibration value (LCV_p) may be derived. The actual luminance calibration value (LCV_p) has the following problems.

Referring to FIGS. 3 and 4, the luminance calibration value (LCV) includes multiple calibration values, and magnitude differences in the multiple calibration values may be represented as shading differences. In a case in which calibration values of which magnitudes are the same are adjacently present, they may be seen as if the same calibration values are aggregated.

While the same calibration values are distributed as if they are aggregated in a second area (S2) of the actual luminance calibration value (LCV_p) illustrated in FIG. 4, distributions of the same calibration values are relatively small in a first area (S1) of the ideal luminance calibration value (LCV_i) illustrated in FIG. 3.

The same calibration values are distributed as if they are aggregated in a second area (S2) of the actual luminance calibration value (LCV_p) illustrated in FIG. 4, and the reason that the calibration values are distributed as if they are aggregated is that the second area (S2) of the display panel 110 has not been appropriately captured due to the limit of the dynamic range (DR) of the luminance capturing camera 130.

The problem due to the limit of the dynamic range (DR) has been described through the second area (S2) illustrated in FIG. 4, and the second area (S2) may be a bright image area. A dark image area may be present in an area other than the second area (S2), and a problem in which capturing is performed such that calibration values are aggregated also in the dark image area may occur.

Although a normal image can be captured from a bright image area or a dark image area by adjusting an exposure time of the luminance capturing camera 130, there is a problem due to a low level saturation phenomenon or a high level saturation phenomenon described below.

When it is assumed that the second area (S2) illustrated in FIG. 4 is a bright area, the bright area may be captured more accurately by shortening the exposure time. However, in such a case, in accordance with shortening of the exposure time, a dark area may not be appropriately captured. The reason for this is that the dynamic range (DR) is saturated with a low level, and this may be referred to as a low-level saturation phenomenon.

When it is assumed that the second area (S2) illustrated in FIG. 4 is a dark area, the dark area may be captured more accurately by lengthening the exposure time. However, in such a case, in accordance with lengthening of the exposure time, a bright area may not be appropriately captured. The reason for this is that the dynamic range (DR) is saturated with a high level, and this may be referred to as a high-level saturation phenomenon.

For example, due to the limit of the dynamic range (DR) of the luminance capturing camera 130, there is a problem that a panel luminance video (PLV) for the display panel (110) is not normally captured.

According to an embodiment of this specification, a method to calibrate luminance of the display panel 110 capable of accurately deriving a calibration value for the luminance of the display panel 110 can be provided.

According to an embodiment of this specification, by accurately deriving a calibration value (CV) for luminance of the display panel 110, a method to calibrate luminance of the display panel 110 capable of having low power consumption can be provided.

Figure 5:
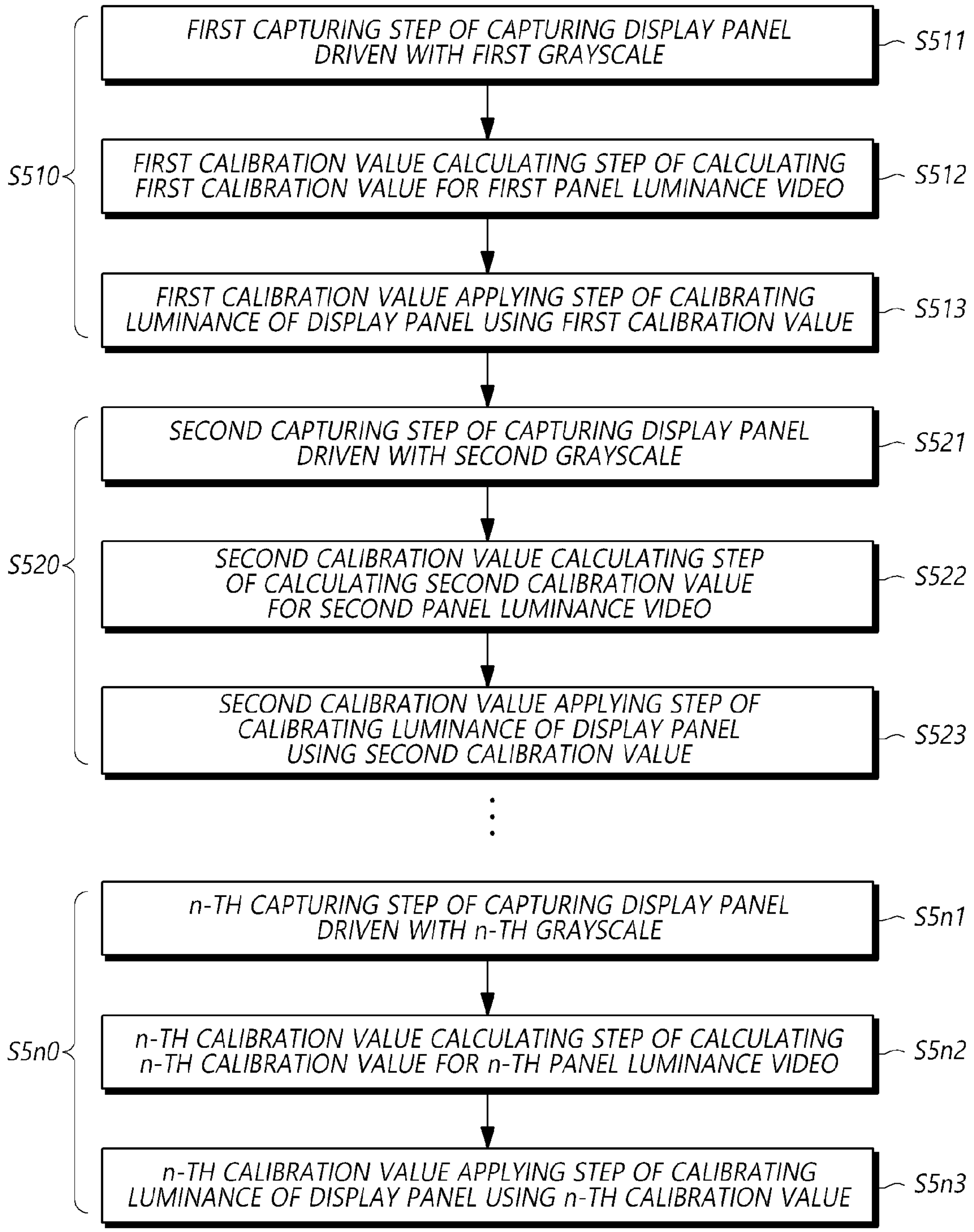
FIG. 5 is a flowchart of a method to calibrate luminance of a display panel according to an embodiment of the present disclosure.
Figure 6:
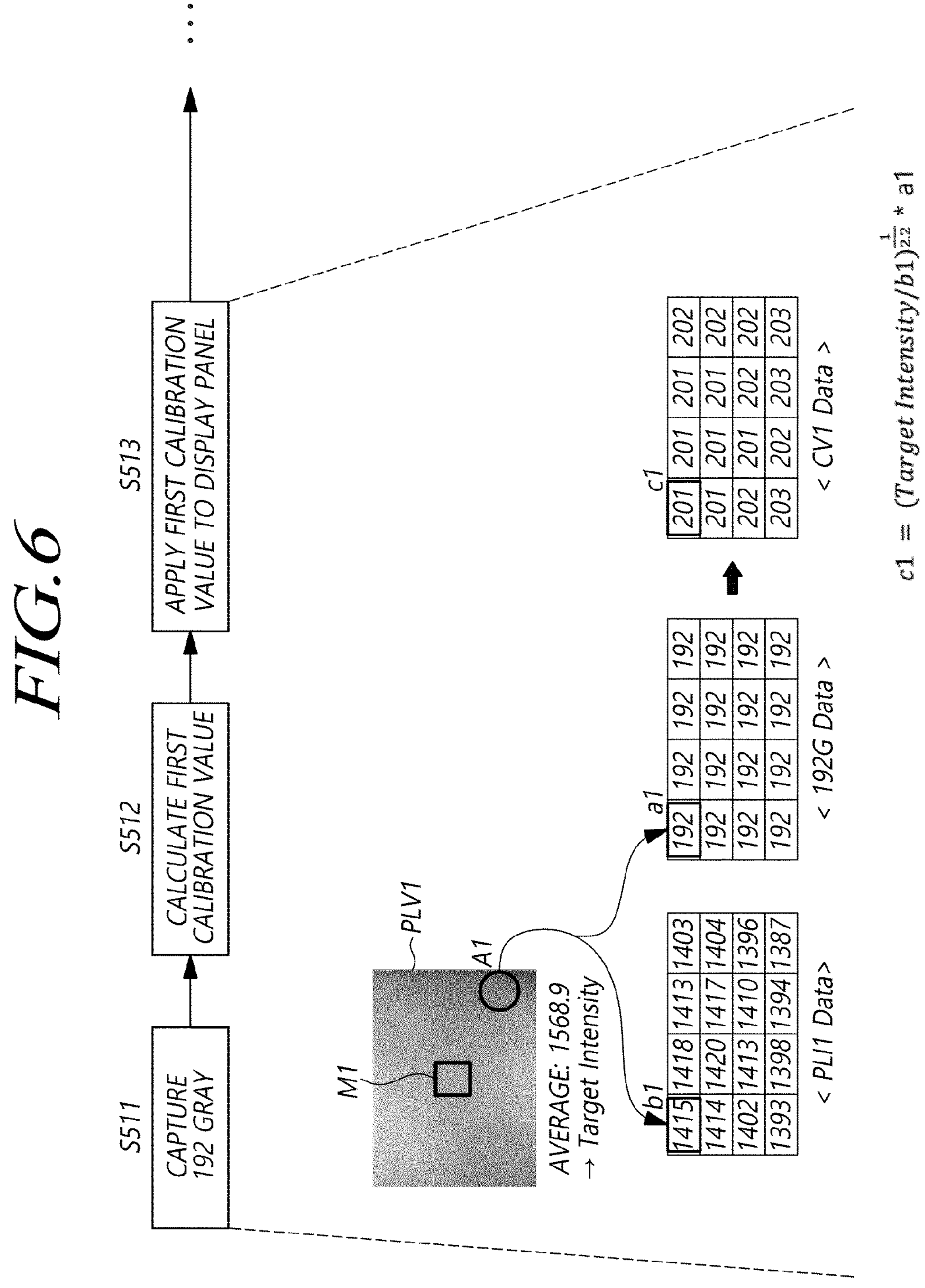
FIG. 6 is a diagram for describing a first luminance calibration step according to an embodiment of the present disclosure as an example.
Figure 7:
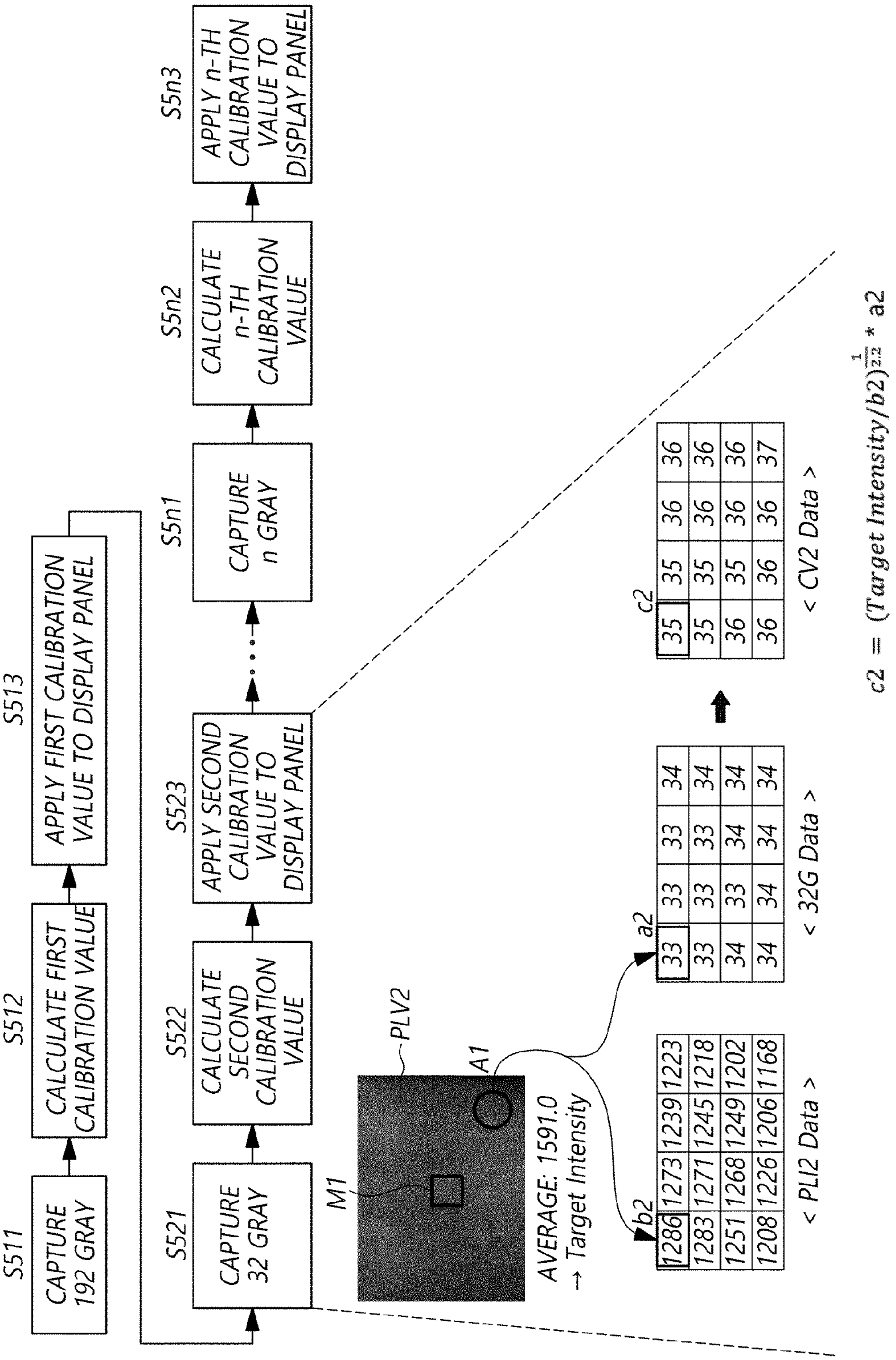
FIG. 7 is a diagram for describing a second luminance calibration step according to an embodiment of the present disclosure as an example.

FIG. 5 is a flowchart of a method to calibrate luminance of a display panel 110 according to an embodiment of the present disclosure. FIG. 6 is a diagram for describing a first luminance calibration step (S510) according to an embodiment of the present disclosure as an example. FIG. 7 is a diagram for describing a second luminance calibration step (S520) according to an embodiment of the present disclosure as an example.

The method to calibrate the luminance of the display panel 110 may include a first luminance calibration step (S510), a second luminance calibration step (S520), and an n-th luminance calibration step (S**5*n*0**).

According to the method to calibrate the luminance of the display panel 110, in accordance with progress of the first luminance calibration step (S510) to the n-th luminance calibration step (S**5*n*0), a calibration value (CV) for the luminance of the display panel (110**) can be derived. "n" described above may be a natural number equal to or greater than 2.

In a case in which n is 2, the method to calibrate the luminance of the display panel 110 may include only the first luminance calibration step (S510) and a second luminance calibration step (S520). Only through the first luminance calibration step (S510) and the second luminance calibration step (S520), a calibration value (CV) for the luminance of the display panel 110 can be derived.

At this time, the display panel 110 may be driven with a low grayscale value in the first luminance calibration step (S510), and the display panel 110 may be driven with a high grayscale value in the second luminance calibration step (S520).

However, to the contrary, the display panel 110 may be driven with a high grayscale value in the first luminance calibration step (S510), and the display panel 110 may be driven with a low grayscale value in the second luminance calibration step (S520).

In a case in which n is 3, the method to calibrate the luminance of the display panel 110 may include a first luminance calibration step (S510), a second luminance calibration step (S520), and a third luminance calibration step (S530).

At this time, the display panel 110 may be driven with a low grayscale value in the first luminance calibration step (S510), the display panel 110 may be driven with an intermediate grayscale value in the second luminance calibration step (S520), and the display panel 110 may be driven with a high grayscale value in the third luminance calibration step (S530).

However, to the contrary, the display panel 110 may be driven with a high grayscale value in the first luminance calibration step (S510), the display panel 110 may be driven with an intermediate grayscale value in the second luminance calibration step (S520), and the display panel 110 may be driven with a low grayscale value in the third luminance calibration step (S530).

In accordance with repetitive progress of the first luminance calibration step (S510), the second luminance calibration step (S520), and the third luminance calibration step (S530), a calibration value (CV) for the luminance of the display panel 110 can be accurately derived.

The first luminance calibration step (S510) may be a step in which, after the display panel 110 driven with a first grayscale value is captured, a first calibration value (CV1) is calculated.

The first luminance calibration step (S510) may include a first capturing step (S511), a first calibration value calculating step (S512), and a first calibration value applying step (S513).

The first capturing step (S511) may be a step in which the display panel (110) driven with the first grayscale value is captured.

In the first capturing step (S511), the display panel 110 may be driven with the first grayscale value.

A first grayscale may be a relatively high grayscale. Hereinafter, a case in which the first grayscale value is a grayscale value of 192 (gray 192) will be assumed in description.

A first panel luminance video (PLV1) may be generated by capturing the display panel (110) driven with the first grayscale value using the luminance capturing camera (130).

Referring to FIG. 6, the first panel luminance video (PLV1) for the display panel (110) driven with the first grayscale value that is a grayscale value of 192 can be checked.

The first calibration value calculating step (S512) may be a step in which a first calibration value (CV1) for the first panel luminance video (PLV1) is calculated.

The first panel luminance video (PLV1) may include multiple pieces of panel luminance intensity data (PLID1).

The number of the multiple pieces of panel luminance intensity data (PLID1) may be the same as the resolution of the display panel (110).

Referring to FIG. 6, 16 pieces of panel luminance intensity data (PLI1 Data) that is partial data of an area A1 (A1) in multiple pieces of panel luminance intensity data (PLID1) can be checked. Relative positions of 16 pieces of panel luminance intensity data (PLI1 data) may be represented using (x, y). Relative positions of 16 pieces of panel luminance intensity data (PLI1 Data) may be represented as "(1,1), (1,2), (1,3), (1,4), (2,1), (2,2), (2,3), (2,4), (3,1), (3,2), (3,3), (3,4), (4,1), (4,2), (4,3), (4,4)". In addition to the panel luminance intensity data (PLID1), relative positions of the grayscale value data (G Data) and calibration values (CV) may be also represented as "(1,1), (1,2), (1,3), (1,4), (2,1), (2,2), (2,3), (2,4), (3,1), (3,2), (3,3), (3,4), (4,1), (4,2), (4,3), (4,4)".

Referring to FIG. 6, 16 pieces of panel luminance intensity data (PLI1 Data) may be "1415, 1418, 1413, 1403, 1414, 1420, 1417, 1404, 1402, 1413, 1410, 1396, 1393, 1398, 1394, 1387".

In order to drive the display panel (110) with uniform luminance, a first calibration value (CV1) may be calculated such that the display panel (110) is driven with target luminance (Target Intensity) having a specific luminance value.

The first calibration value (CV1) may include multiple pieces of calibration data (CD1).

Referring to FIG. 6, the target luminance (Target Intensity) may be average luminance of a specific area of the display panel (110). For example, a specific area of the display panel (110) may be a center area (M1) of the display panel (110). However, average luminance of an area other than the center area (M1) may be target luminance (Target Intensity).

Referring to FIG. 6, for example, the target luminance (Target Intensity) may be 1568.9.

A first grayscale value group (GG1) may include multiple pieces of grayscale data (G Data1).

The first grayscale value group (GG1) may be a grayscale value with which the display panel (110) is driven. Referring to FIG. 6, the display panel (110) is driven with a grayscale value of 192 (gray 192), and thus the first grayscale value group (GG1) may be a 192-grayscale value group (192GG).

In the first calibration value calculating step (S512), the 192-grayscale value group (192GG) may only include grayscale data (G Data1) having a value of 192. In other words, the 192-grayscale value group (192GG) may include grayscale data (G Data1) of "192, 192, 192, 192, 192, 192, 192, 192, 192, 192, 192, 192, 192, 192, 192, 192".

Since a calibration value derived before the first calibration value calculating step (S512) is not present, the 192-grayscale value group (192GG) may have all the values of 192.

The first calibration value (CV1) may be calculated using the target luminance (Target Intensity), the panel luminance intensity data (PLID1), and the first grayscale value group (GG1).

The first calibration value (CV1) may be derived using a relational equation of "{(target luminance/panel luminance intensity)^(1/2.2)}*first grayscale value group (GG1)".

Since the first grayscale value group (GG1) may be the 192-grayscale value group (192GG), the first calibration value (CV1) may be derived using a relational equation of "{(target luminance/panel luminance intensity)^(1/2.2)}*192-grayscale value group (192GG)".

Referring to FIG. 6, data positioned at (1, 1) of an area A1 (A1) will be described as an example.

Target luminance needs to be applied same to all the positions in the display panel (110) and thus is 1568.9. A panel luminance intensity (b1) of (1, 1) of the area A1 (A1) is 1415. 192-grayscale data (a1) of (1, 1) of the area A1 (A1) is 192. When this is substituted into the relational equation described above, it may be "{(1568.9/1415)^ (1/2.2)} *192", and a calibration value (c1) may be derived to be about 201.

According to the method described above, calibration data (CV1 Data) of the area A1 (A1) in the first calibration value (CV1) may be "201, 201, 201, 202, 201, 201, 201, 202, 202, 201, 202, 202, 203, 202, 203, 203".

The first calibration value applying step (S513) may be a step in which the luminance of the display panel 110 is calibrated using the first calibration value (CV1).

In the first calibration value applying step (S513), in accordance with calibration of the display panel 110 using the first calibration value (CV1), the luminance of the display panel 110 can be improved primarily.

The luminance of the display panel 110 has been improved primarily. In accordance with primary improvement of the luminance of the display panel 110, a luminance difference between a bright image area and a dark image area decreases from that before the improvement.

After the first luminance calibration step (S510), the process may proceed to the second luminance calibration step (S520).

The second luminance calibration step (S520) may be a step in which, after the display panel 110 driven with a second grayscale value is captured, a second calibration value (CV2) is calculated.

The second luminance calibration step (S520) may include a second capturing step (S521), a second calibration value calculating step (S522), and a second calibration value applying step (S523).

The second capturing step (S521) may be a step in which the display panel (110) driven with a second grayscale value is captured.

In the second capturing step (S521), the display panel (110) may be driven with the second grayscale value.

The second grayscale may be a relatively intermediate grayscale. In description, a case in which the second grayscale value is a grayscale value of 32 (32 gray) will be assumed.

A second panel luminance video (PLV2) may be generated by capturing the display panel (110) driven with the second grayscale value using the luminance capturing camera (130).

Referring to FIG. 7, the second panel luminance video (PLV2) for the display panel 110 driven with the second grayscale value that is a grayscale value of 32 can be checked.

In the first calibration value applying step (S513), the luminance of the display panel 110 has been improved primarily. In accordance with the primary improvement of the luminance of the display panel 110, a luminance difference between a bright image area and a dark image area decreases. In other words, even when the display panel (110) is captured by the same luminance capturing camera 130, a luminance difference between a bright image area and a dark image area has decreased, and thus the second panel luminance video (PLV2) can be captured in the range of the dynamic range (DR).

The second calibration value calculating step (S522) may be a step in which a second calibration value (CV2) for the second panel luminance video (PLV_I) is calculated.

The second panel luminance video (PLV2) may include multiple pieces of panel luminance intensity data (PLID2).

The number of the multiple pieces of panel luminance intensity data (PLID2) may be the same as the resolution of the display panel (110).

Referring to FIG. 7, 16 pieces of panel luminance intensity data (PLI2 Data) that is partial data of an area A1 (A1) in the multiple pieces of panel luminance intensity data (PLID2) can be checked.

Referring to FIG. 7, 16 pieces of panel luminance intensity data (PLI2 Data) may be "1286, 1273, 1239, 1223, 1283, 1271, 1245, 1218, 1251, 1268, 1249, 1202, 1208, 1226, 1206, 1168".

In order to drive the display panel 110 with uniform luminance, the second calibration value (CV2) may be calculated such that the display panel 110 is driven with target luminance (Target Intensity) having a specific luminance value.

The second calibration value (CV2) may include multiple pieces of calibration data (CD2).

Referring to FIG. 7, the target luminance (target intensity) may be average luminance of a specific area of the display panel 110. For example, the specific position of the display panel 110 may be a center area (M1) of the display panel 110. However, average luminance of an area other than the center area (M1) may be target luminance (Target Intensity).

Referring to FIG. 7, for example, the target luminance (Target Intensity) may be 1591.0.

The second grayscale value group (GG2) may include multiple pieces of grayscale data (G Data2).

Referring to FIG. 7, the display panel (110) is driven with a grayscale value of 32 (32 gray), and thus the second grayscale value group (GG2) may be a 32-grayscale value group (32GG).

In the second calibration value calculating step (S522), the 32-grayscale value group (32GG) may have grayscale data (G Data2) acquired by performing calibration on the basis of a 192-grayscale value group (192GG).

The 32-grayscale value group (32GG) may include multiple pieces of grayscale data (G Data2) that is "32+ grayscale difference". The grayscale difference described above may be set on the basis of the 192-grayscale value group (192GG), and first grayscale data of the position of (1, 1) of the area A1 (A1) will be described as an example. 192 grayscale data (a1) of the position of (1, 1) of the area A1 (A1) was 192. The first calibration data (c1) of the position of (1, 1) of the area A1 (A1) was 201. The grayscale (a1) was calibrated to the grayscale (c1) of 201, and thus a relative magnitude difference can be reflected on the grayscale difference. For example, the grayscale value of (1, 1) of the area A1 (A1) may be k*(201-192)*32/192. Here, k is a constant, and k may be 1 or a value other than 1 depending on the design. In a case in which the method described above is applied, the 32-grayscale value group (32GG) may include grayscale data (G Data2) of "33, 33, 33, 34, 33, 33, 33, 34, 34, 33, 34, 34, 34, 34, 34, 34".

The second calibration value (CV2) may be calculated using the target luminance (Target Intensity), the panel luminance intensity data (PLID2), and the 32-grayscale value group (32GG).

The second calibration value (CV2) may be derived using a relational equation of "{(target luminance/panel luminance intensity^(1/2.2)}*second grayscale value group (GG2)".

Since the second grayscale value group (GG2) may be the 32-grayscale value group (32GG), the second calibration value (CV2) may be derived using a relational equation of "{(target luminance/panel luminance intensity^ (1/2.2)}*32-grayscale value group (32GG)".

Referring to FIG. 7, data positioned at (1, 1) of the area A1 (A1) will be described as an example.

The target luminance needs to be applied same to all the positions in the display panel (110) and thus is 1591.0. A panel luminance intensity (b2) of (1, 1) of the area A1 (A1) is 1286. 32 grayscale data (a2) of (1, 1) of the area A1 (A1) is 33. When these are substituted into the relational equation described above, "{(1591.0/1286)^(1/2.2)}*33" can be acquired, and a calibration value (c2) is derived to be about 35.

According to the method described above, calibration data (CV2 Data) of the area A1 (A1) in the second calibration values (CV2) may be "35, 35, 36, 36, 35, 35, 36, 36, 36, 35, 36, 36, 36, 36, 36, 37".

The second calibration value applying step (S523) may be a step in which the luminance of the display panel (110) is calibrated using the second calibration value (CV2).

In accordance with the display panel 110 being calibrated using the second calibration value (CV2) in the second calibration value applying step (S523), the luminance of the display panel 110 can be improved secondarily.

Although the process may proceed to the third luminance calibration step (S530) after the second luminance calibration step (S520), the calibration value (CV) can be accurately derived only through the progress of the first luminance calibration step (S510) and the second luminance calibration step (S520). The luminance of the display panel (110) can be primarily improved in the first luminance calibration step (S510), and the luminance of the display panel 110 may be improved secondarily in the second luminance calibration step (S520). In accordance with sequential improvement of the luminance, a brightness difference between a dark image area and a bright image area in the panel luminance video (PLV) of the display panel 110 can decrease. For example, in accordance with a decrease in the brightness difference, the panel luminance video (PLV) can be generated in the range of the dynamic range (DR) of the luminance capturing camera (130). In a case in which a calibration value (CV) is generated using the panel luminance video (PLV) captured in the range of the dynamic range (DR), an accurate calibration value (CV) can be generated.

For example, although the process proceeds only up to the second luminance calibration step (S520), the calibration value (CV) can be accurately derived.

For example, in a case in which the process proceeds up to the n-th luminance calibration step (S**5*n*0) after the second luminance calibration step (S520), a more accurate calibration value (CV) can be derived. In accordance with this, after the second luminance calibration step (S520), the process may proceed to the third luminance calibration step (S530**).

The n-th luminance calibration step (S**5*n*0) may be a step in which, after the display panel 110** driven with an n-th grayscale value is captured, an n-th calibration value (CVn) is calculated.

The n-th luminance calibration step (S**5*n*0) is an n-th luminance calibration step, and, for example, in a case in which n is 3, the n-th luminance calibration step (S5*n*0) may be the third luminance calibration step (S530**).

The n-th luminance calibration step (S**5*n*0) may include an n-th capturing step (S5*n*1), an n-th calibration value calculating step (S5*n*2), and an n-th calibration value applying step (S5*n*3**).

The n-th capturing step (S**5*n*1) may be a step in which the display panel 110** driven with an n-th grayscale value is captured.

In the n-th capturing step (S**5*n*1), the display panel 110** may be driven with the n-th grayscale value.

The n-th grayscale value may be a relatively low grayscale. For example, the n-th grayscale value may be a grayscale lower than the grayscale value of 32.

An n-th panel luminance video (PLVn) may be generated by capturing the display panel 110 driven with the n-th grayscale value using the luminance capturing camera 130.

The n-th calibration value calculating step (S**5*n*2**) may be a step in which an m-th calibration value (CVn) for the n-th panel luminance video (PLVn) is calculated.

The n-th panel luminance video (PLVn) may include multiple pieces of panel luminance intensity data (PLIDn).

The number of the multiple pieces of panel luminance intensity data (PLIDn) may be the same as the resolution of the display panel 110.

In order to drive the display panel 110 with uniform luminance, the n-th calibration value (CVn) may be calculated such that the display panel 110 is driven with target luminance (Target Intensity) having a specific luminance value.

The n-th calibration value (CVn) may include multiple pieces of calibration data (CDn).

The target luminance (target intensity) may be average luminance of a specific area of the display panel 110. For example, the specific position of the display panel 110 may be a center area of the display panel 110. However, average luminance of an area other than the center area may be target luminance (Target Intensity).

The n-th grayscale value group (GGn) may include multiple pieces of grayscale data (G Data n).

The n-th grayscale value group (GGn) may be a grayscale value with which the display panel 110 is driven.

The n-th grayscale value group (GGn) may include multiple pieces of grayscale data (G Data n) that is "n+ grayscale difference". The grayscale difference described above may be set on the basis of the 192-grayscale value group (192GG).

The n-th calibration value (CVn) may be calculated using the target luminance (Target Intensity), the panel luminance intensity data (PLID), and the n-th grayscale value group (GGn).

The n-th calibration value (CVn) may be derived using a relational equation of "{(target luminance/panel luminance intensity}^(1/2.2)}*n-th grayscale value group (GGn)".

The n-th calibration value applying step (S**5*n*3) may be a step in which the luminance of the display panel 110** is calibrated using the n-th calibration value (CVn).

In accordance with the display panel 110 being calibrated using the n-th calibration value (CVn) in the n-th calibration value applying step (S**5*n*3), the luminance of the display panel 110** can be improved in an n-th order.

The details described above can be summarized as follows. Due to the limit of the dynamic range (DR) of the luminance capturing camera 130, there is a problem in that the calibration value (CV) for the luminance of the display panel 110 is not appropriately derived.

In accordance with progress of the first luminance calibration step (S510) to the n-th luminance calibration step (S**5*n*0), the calibration value (CV) for the luminance of the display panel 110** can be accurately derived.

In accordance with progress of the first luminance calibration step (S510), the luminance of the display panel 110 can be improved primarily. In accordance with primary improvement of the luminance of the display panel 110, a luminance difference between a bright image area and a dark image area can decrease. For example, even when the display panel 110 is captured by the same luminance capturing camera 130, a luminance difference between a bright image area and a dark image area has decreased, and thus a panel luminance video (PLV) can be captured in the range of the dynamic range (DR).

In accordance therewith, when the second luminance calibration step (S520) progresses, the panel luminance video (PLV) can be generated in the range of the dynamic range (DR) of the luminance capturing camera 130. A calibration value (CV) may be generated on the basis of the generated panel luminance video (PLV). For example, the calibration value (CV) for the luminance of the display panel 110 can be accurately derived.

The calibration value (CV) can be accurately derived only through the first luminance calibration step (S510) and the second luminance calibration step (S520).

If the process proceeds up to the n-th luminance calibration step (S**5*n*0) after the second luminance calibration step (S520**), a more accurate calibration value (CV) can be derived.

According to the embodiment of this specification described above, a method to calibrate the luminance of a display panel 110 capable of accurately deriving a calibration value (CV) for luminance of the display panel 110 can be provided.

According to the embodiment of this specification, by accurately deriving a calibration value (CV) for luminance of the display panel 110, a method to calibrate luminance of the display panel 110 capable of having low power consumption can be provided.

The embodiment of this specification described above can be briefly described as below.

According to an embodiment of this specification, a method to calibrate luminance of a display panel including: generating a first panel luminance video by capturing a display panel driven with a first grayscale; calculating a first calibration value for the first panel luminance video; calibrating the display panel using the first calibration value;

generating a second panel luminance video by driving the display panel calibrated using the first calibration value with a second grayscale and capturing the display panel driven with the second grayscale; calculating a second calibration value for the second panel luminance video; and calibrating the display panel using the second calibration value can be provided.

According to some embodiments of this specification, in the generating of the first panel luminance video, the first panel luminance video may include multiple pieces of panel luminance intensity data.

According to some embodiments of this specification, in the calculating of the first calibration value, the first calibration value may include multiple pieces of calibration data corresponding to multiple pieces of panel luminance intensity data.

According to some embodiments of this specification, in the calculating of the first calibration value, a first grayscale value group for the first grayscale is generated, and the first grayscale value group may include multiple pieces of grayscale data.

According to some embodiments of this specification, in the calculating of the first calibration value, first calibration data included in the first calibration value may be generated on the basis of average luminance of a specific area of the display panel, first panel luminance intensity data included in the first panel luminance video, first grayscale data included in the first grayscale value group, and the first grayscale.

According to some embodiments of this specification, in the generating of the second panel luminance video, all the multiple pieces of grayscale data included in the first grayscale value group may have the same first grayscale.

According to some embodiments of this specification, in the generating of the second panel luminance video, the second panel luminance video may include multiple pieces of panel luminance intensity data.

According to some embodiments of this specification, in the calculating of the second calibration value, the second calibration value may include multiple pieces of calibration data corresponding to the multiple pieces of panel luminance intensity data.

According to some embodiments of this specification, in the calculating of the second calibration value, a second grayscale value group for the second grayscale is generated, and the second grayscale value group may include multiple pieces of grayscale data.

According to some embodiments of this specification, in the calculating of the second calibration value, second calibration data included in the second calibration value may be generated on the basis of average luminance of a specific area of the display panel, second panel luminance intensity data included in the second panel luminance video, second grayscale data included in the second grayscale value group, and the second grayscale.

According to some embodiments of this specification, the second grayscale value group may be calculated on the basis of the first grayscale value group and the first calibration value.

Some embodiments of this specification may further include: generating a third panel luminance video by driving the display panel calibrated using the second calibration value with a third grayscale and capturing the display panel driven with the third grayscale; calculating a third calibration value for the third panel luminance video; and calibrating the display panel using the third calibration value.

According to some embodiments of this specification, the first grayscale may have a grayscale value larger than the second grayscale.

According to some embodiments of this specification, the first grayscale may have a grayscale value smaller than the second grayscale.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention.

REFERENCE SIGNS LIST

100: Display device
110: Display panel
120: Inspection stand
130: Luminance capturing camera
PLV: Panel luminance video
PLID: Panel luminance intensity data
LCV: Luminance calibration value
CV: Calibration value
CD: Calibration data
CG: Grayscale value group
G Data: Grayscale data

What is claimed is:

1. A method of calibrating luminance of a display panel, the method comprising:
- driving a display panel with a first grayscale, and capturing, by a camera, the display panel on which a first image configured with the first grayscale is displayed and generating a first panel luminance image based on a first luminance from the first image configured with the first grayscale;
- calculating a first calibration value for the first panel luminance image;
- applying the first calibration value to the display panel so that the display panel is configured with the first calibration value;
- driving the display panel configured with the first calibration value with a second grayscale, capturing, by the camera, the display panel on which a second image configured with the second grayscale is displayed and generating a second panel luminance image based on a second luminance from the second image configured with the second grayscale;
- calculating a second calibration value for the second panel luminance image; and
- applying the second calibration value to the display panel so that the display panel is configured with the second calibration value.

2. The method of calibrating the luminance of the display panel according to claim 1, wherein the first panel luminance image includes multiple pieces of panel luminance intensity data.

3. The method of calibrating the luminance of the display panel according to claim 2, wherein the first calibration value includes multiple pieces of calibration data corresponding to multiple pieces of panel luminance intensity data.

4. The method of calibrating the luminance of the display panel according to claim 3, wherein calculating the first calibration value comprises generating a first grayscale value group for the first grayscale, and wherein the first grayscale value group includes multiple pieces of grayscale data.

5. The method of calibrating the luminance of the display panel according to claim 4, wherein calculating the first calibration value comprises generating first calibration data included in the first calibration value based on an average luminance of a specific area of the display panel, first panel luminance intensity data included in the first panel luminance image, first grayscale data included in the first grayscale value group, and the first grayscale.

6. The method of calibrating the luminance of the display panel according to claim 4, wherein all the multiple pieces of grayscale data included in the first grayscale value group have a same first grayscale.

7. The method of calibrating the luminance of the display panel according to claim 5, wherein the second panel luminance image includes multiple pieces of panel luminance intensity data.

8. The method of calibrating the luminance of the display panel according to claim 7, wherein the second calibration value includes multiple pieces of calibration data corresponding to the multiple pieces of panel luminance intensity data.

9. The method of calibrating the luminance of the display panel according to claim 8, wherein calculating the second calibration value comprises generating a second grayscale value group for the second grayscale, and wherein the second grayscale value group includes multiple pieces of grayscale data.

10. The method of calibrating the luminance of the display panel according to claim 9, wherein calculating the second calibration value comprises generating second calibration data included in the second calibration value based on an average luminance of a specific area of the display panel, second panel luminance intensity data included in the second panel luminance image, second grayscale data included in the second grayscale value group, and the second grayscale.

11. The method of calibrating the luminance of the display panel according to claim 9, wherein the second grayscale value group is calculated based on the first grayscale value group and the first calibration value.

12. The method of calibrating the luminance of the display panel according to claim 1, further comprising:

generating a third panel luminance video by driving the display panel calibrated using the second calibration value with a third grayscale and capturing the display panel driven with the third grayscale;

calculating a third calibration value for the third panel luminance video; and calibrating the display panel using the third calibration value.

13. The method of calibrating the luminance of the display panel according to claim 1, wherein the first grayscale has a grayscale value that is greater than a grayscale value of the second grayscale.

14. The method of calibrating the luminance of the display panel according to claim 1, wherein the first grayscale has a grayscale value that is less than a grayscale value of the second grayscale.

15. A display compensation system comprising:

a luminance capturing camera spaced apart from a display panel and located at a place facing the display panel, and configured to capture an image displayed on the display panel; and a display compensation device configured to receive the image captured by the luminance capturing camera and calibrate luminance uniformity of the display panel based on the captured image; and wherein, after the display compensation device receives of a first panel luminance image generated by capturing the display panel driven with a first grayscale from the luminance capturing camera, the display compensation device is configured to calculate a first calibration value for the first panel luminance image and apply the first calibration value to the display panel, and wherein the display panel configured with the first calibration value is driven with a second grayscale, and after the display compensation device receives a second panel luminance image generated by capturing the display panel driven with the second grayscale from the luminance capturing camera, the display compensation device is configured to calculate a second calibration value for the second panel luminance image and apply the second calibration value to the display panel.

16. The method of calibrating the luminance of the display panel according to claim 1, wherein the first and second panel luminance images provided by the camera include panel luminance intensity data.

17. The method of calibrating the luminance of the display panel according to claim 14, wherein magnitudes of panel luminance intensity data are determined by a setting of the camera.

18. The display compensation system according to claim 15, wherein the first and second panel luminance images provided by the luminance capturing camera include panel luminance intensity data.

19. The display compensation system according to claim 18, wherein magnitudes of panel luminance intensity data are determined by a setting of the luminance capturing camera.

* * * * *